UNITED STATES PATENT OFFICE.

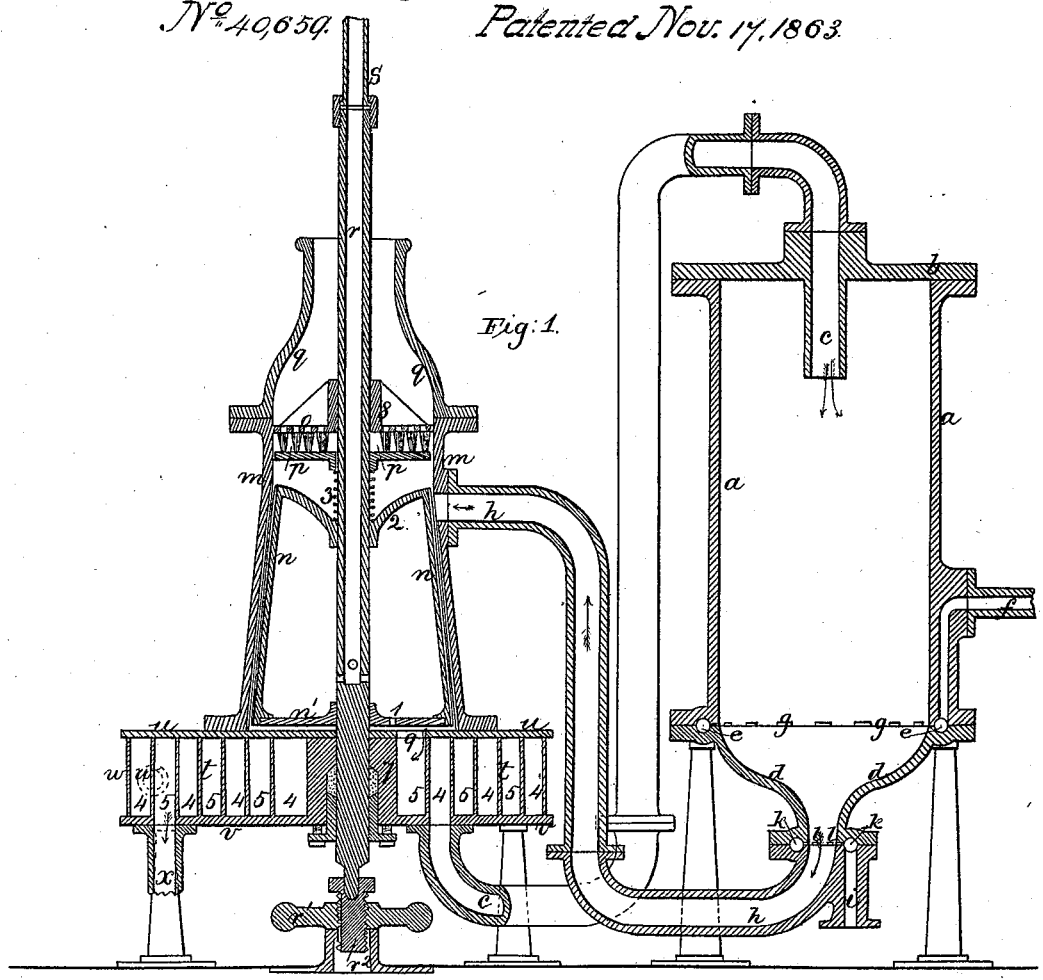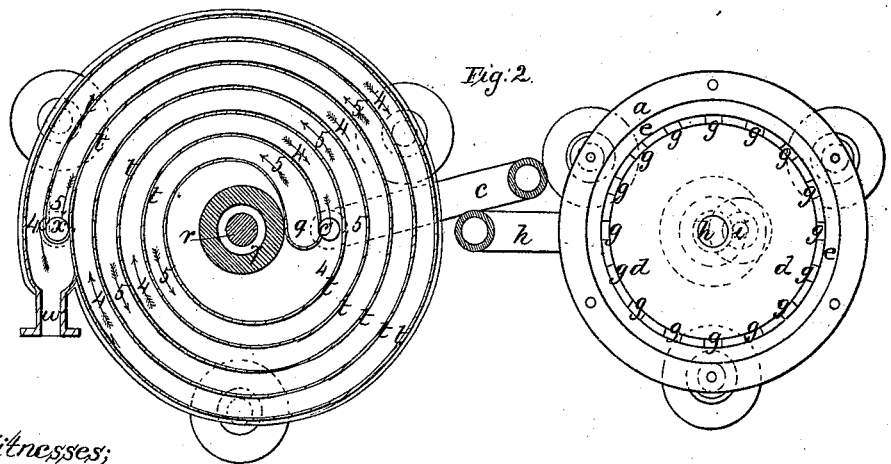

JIM B. FULLER, OF CLAREMONT, NEW HAMPSHIRE, ASSIGNOR TO HIMSELF AND JAMES P. UPHAM, OF SAME PLACE.

IMPROVEMENT IN PREPARING VEGETABLE FIBER FOR PAPER, &C.

Specification forming part of Letters Patent No. 40,659, dated November 17, 1863.

*To all whom it may concern:*

Be it known that I, JIM B. FULLER, of Claremont, in the county of Sullivan and State of New Hampshire, have invented and made a certain new and useful Improvement in the Preparation of Vegetable Fiber for Paper, &c.; and I do hereby declare the following to be a full, clear, and exact description of my said invention, reference being had to the annexed drawings, making part of this specification, wherein—

Figure 1 is a vertical section of my apparatus, and Fig. 2 is a sectional plan of the same.

Similar letters denote the same parts in both figures.

Paper-stock has heretofore been manufactured by boiling straw and other vegetable matter, and subjecting it to a grinding or beating operation, and these have been performed under considerable pressure, as well as in the atmosphere.

The nature of my said invention consists in curing the vegetable material in a vessel by means of steam admitted in jets around said vessel, so as to heat the mass thoroughly and uniformly, and at the same time produce, by the jets of steam, a sufficient motion or agitation to mix and commingle vegetable matter thoroughly. This operation is performed under the necessary heat and pressure, and the uncured vegetable material is supplied near the top of such vessel. I allow the cured material to pass away through a pipe of the required size or through a regulated opening directly to the grinder. The pressure is now relieved, but the heat of the vegetable fiber is maintained and the grinding performed under little or no pressure, in order to separate the fibers from the gummy, silicious, and other matters commingled with the said fiber, and from the grinder the material is conveyed away through a spiral channel and cooled by the uncured material in a similar spiral channel, in which it travels in the opposite direction and on both sides of the heated material, so as to abstract the heat from the same.

In the drawings, $a$ is a vessel of suitable size with a head, $b$, and funnel-shaped bottom $d$.

$c$ is a pipe through which the uncured vegetable matter, mixed with sufficient water, is introduced, as hereinafter specified.

$e$ is an annular space formed in the flanges of $a$ and $d$ at the part where they come together, and with this space a steam-pipe, $f$, connects, and $g\ g$ are openings through which jets of steam pass into the vegetable material contained in the vessel $a$.

$k$ is an annular space with jets at $l$ and steam pipe at $i$, by which steam is supplied to the material in the funnel-shaped bottom $d$, and thence passes up through the vegetable material in $a$. The jets of steam, in passing up through the vegetable material, produce a sufficient agitation to mix and commingle the mass at the same time that the curing is effected by the steam coming in contact with such vegetable material, which softens the gummy and silicious substances, so that the fibers may easily be separated, as hereinafter set forth. The steam may be admitted at one or more ranges of jets.

$h$ is a pipe connecting the curing-vessel $a$ with the grinder-case $m$, in which is the grinder $n$ on the shaft $r$. The surfaces of $n$ and $m$ are corrugated with ribs, as seen in Fig. 3, and both are conical, so that the distance remaining between these corrugated surfaces may be regulated, as may be required, for grinding the material passing between them, this regulation being effected by the nut-wheel $r'$ and screw-step $r^2$ to the shaft $r$.

The grinder $n$ is made hollow, with a head, 2, at the smaller end, and the head $n'$ at the larger end, in which latter head is a hole, 1. The shaft $r$ is hollow, and connected at the upper end with a steam-pipe, $s$, by any suitable coupling, and an opening in the side of the shaft allows steam to pass through the hollow shaft into the interior of $n$, to keep that in a heated state, and the water of condensation passes away at the hole 1, and commingles with the paper-stock. The shaft $r$ rotates in a stuffing-box, 7, at the lower end of $n$, and in a journal-box, 8, above $n$, and around this box 8 is a screen or sieve, $o$, and beneath it a brush, $p$, made on arms extending from a ring around $r$, and a spring, 3, keeps the brush $p$ up toward this grating or sieve $o$, and above the grinder $m$ is a funnel or pipe, $q$, that rises to a sufficient height to cause the column of water therein contained to act with sufficient force to drive the paper-stock through the grinder with the speed necessary for its treatment in said mill.

The operation of this apparatus thus far described is as follows: The vegetable matter—such as straw, wood, hemp, flax, &c.—in a sufficiently comminuted state, is introduced by a pump or otherwise, with water, into the vessel $a$ through the pipe $c$, in which vessel the steam admitted by the jets at $g$ $l$ cures, softens, and prepares such vegetable matter by acting on the glutinous materials and silica that are found in such vegetable matters and ho d the fibrous particles together, so that these fibers can be separated by rubbing or grinding; and while in this softened or cured state, and still hot, the material passes away gradually but directly to the grinder, as the fresh or uncured material is forced into the upper part of the curing-vessel $a$. The grinding operation is next performed on the hot material, and the temperature required is maintained by the steam introduced into $n$. The watery matter accompanying the fiber (consisting of the hot water impregnated with coloring-matter and other soluble impurities from the vegetable materials) rises through the sieve $o$ in the pipe $q$, and may overflow and be led away, if desired, and said sieve $o$ retains the fibrous materials, and said sieve is kept clean by the brush $p$, revolving with the grinder. The column of water in $q$ is to be sufficient to maintain a slight pressure on the grinder.

From the grinder my cured vegetable fiber is taken away and may be still further washed, to separate any coloring-matter or to convey away any particles that may not be fibrous, such as the silicious and gummy matters that have been ground or rubbed off the fiber and are contained in the water. The vegetable material passes out at an opening, 9, into the double volute transfuser $t$, formed with a top, $u$, and bottom $v$, between which are volute plates leaving passages 4 and 5. The heated vegetable fiber and liquid enter the passage 5 by the opening 9, and travel in the direction of the arrows and escape at the pipe $x$, while the uncured vegetable matter and water are forced in by a pump or otherwise at the pipe $w$, and travel through the passage 4, in the opposite direction to the point at which the pipe $c$ is attached. Thus the heated material is cooled and its heat imparted or transfused to the uncured material, so that that enters the curing-vessel at a high temperature, thus saving as much heat as possible by this apparatus, which is very compact and efficient.

This improvement in separating vegetable fiber is adapted to preparing fiber for paper; but it will be evident that such prepared vegetable fiber may be employed in any other manufacture.

I do not claim forcing the material through the grinder by the action of the pump, as no such operation is performed in my apparatus. The material from the curing-vessel is discharged into the grinder, and the grinder, being open, is easily accessible, and any surplus water may flow away, and the grinding operation being performed immediately on the delivery from the curing-vessel, there is no opportunity for the material to cool and the silicious substances to again harden; and I do not claim saving the heat of the material by passing the same in opposite directions to the fresh material, as that has before been known.

What I claim, and desire to secure by Letters Patent, is—

1. Curing vegetable fiber in a vessel by means of jets of steam introduced into such vessel, substantially as and for the purposes specified.

2. An open grinder, receiving the fibrous material directly from the curing vessel, as specified, so that the grinding operation is independent of the curing operation, but the vegetable fiber is ground while hot, as set forth.

3. Separating the fiber from the overflow water by means of the sieve $o$ and brush $p$, as set forth.

4. Heating the interior of the grinder $n$ by the introduction of steam, for the purposes specified.

5. A column of water rising sufficiently above the grinder to produce the hydrostatic pressure necessary for causing the fibrous materials to pass through the grinder, as specified.

6. The double volute or spiral channels, for cooling the cured vegetable fiber and imparting the heat thereof to the uncured vegetable material traveling in the intervening volute channels in the opposite direction, as specified.

In witness whereof I have hereunto set my signature this 18th day of August, 1863.

JIM B. FULLER.

Witnesses:
  LEMUEL W. SERRELL,
  THOS. GEO. HAROLD.